Oct. 18, 1955 E. M. ELMER 2,721,284
INTEGRATING MOTOR
Filed May 3, 1952 10 Sheets-Sheet 1
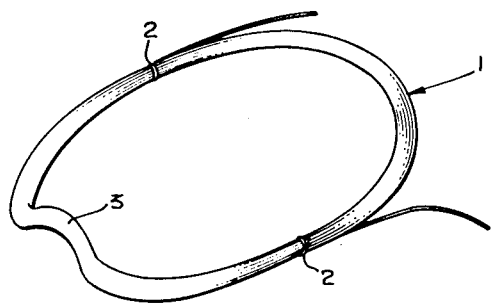
Fig.1.
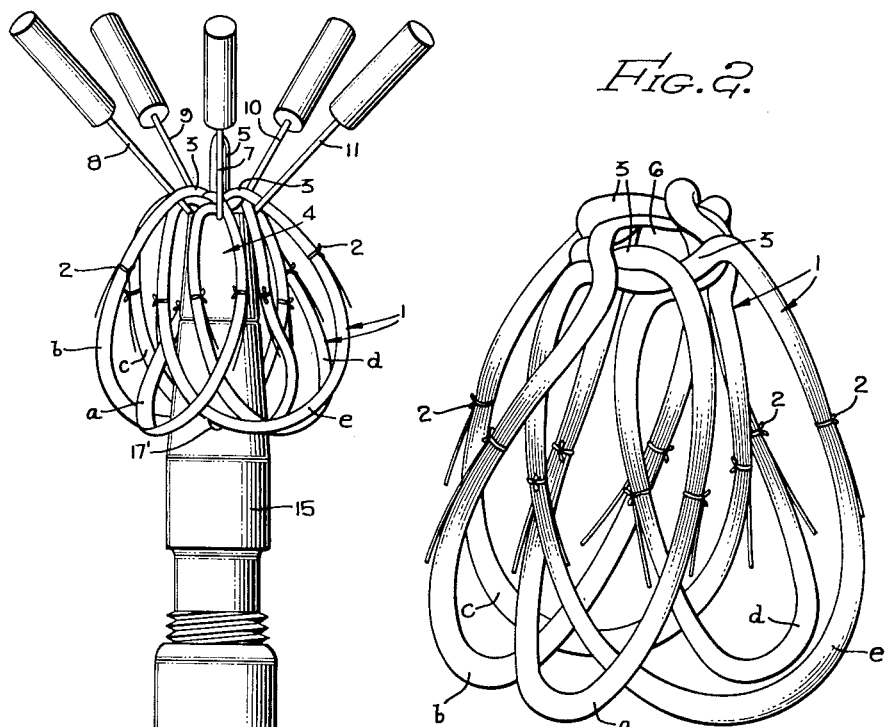
EDWARD M. ELMER,
INVENTOR.
BY R. E. Geangue
ATTORNEY Oct. 18, 1955

E. M. ELMER 2,721,284

INTEGRATING MOTOR

Filed May 3, 1952

EDWARD M. ELMER,
INVENTOR.

BY R. E. Geangue

ATTORNEY

Oct. 18, 1955     E. M. ELMER     2,721,284
INTEGRATING MOTOR

Filed May 3, 1952     10 Sheets-Sheet 3

EDWARD M. ELMER,
INVENTOR.

BY R. E. Geangue

ATTORNEY

Oct. 18, 1955   E. M. ELMER   2,721,284
INTEGRATING MOTOR
Filed May 3, 1952   10 Sheets-Sheet 4

EDWARD M. ELMER,
INVENTOR.

BY R. E. Geangue
ATTORNEY

Oct. 18, 1955     E. M. ELMER     2,721,284
INTEGRATING MOTOR

Filed May 3, 1952                                           10 Sheets-Sheet 5

EDWARD M. ELMER,
INVENTOR.

BY R. E. Geaugne

ATTORNEY

Oct. 18, 1955      E. M. ELMER      2,721,284
INTEGRATING MOTOR

Filed May 3, 1952      10 Sheets-Sheet 6

EDWARD M. ELMER,
INVENTOR.

BY R. E. Geangue

ATTORNEY

Oct. 18, 1955

E. M. ELMER 2,721,284

INTEGRATING MOTOR

Filed May 3, 1952

EDWARD M. ELMER,
INVENTOR.

BY R. E. Granque

ATTORNEY

Oct. 18, 1955

E. M. ELMER 2,721,284

INTEGRATING MOTOR

Filed May 3, 1952

EDWARD M. ELMER,
INVENTOR.

BY R. E. Geauque

ATTORNEY

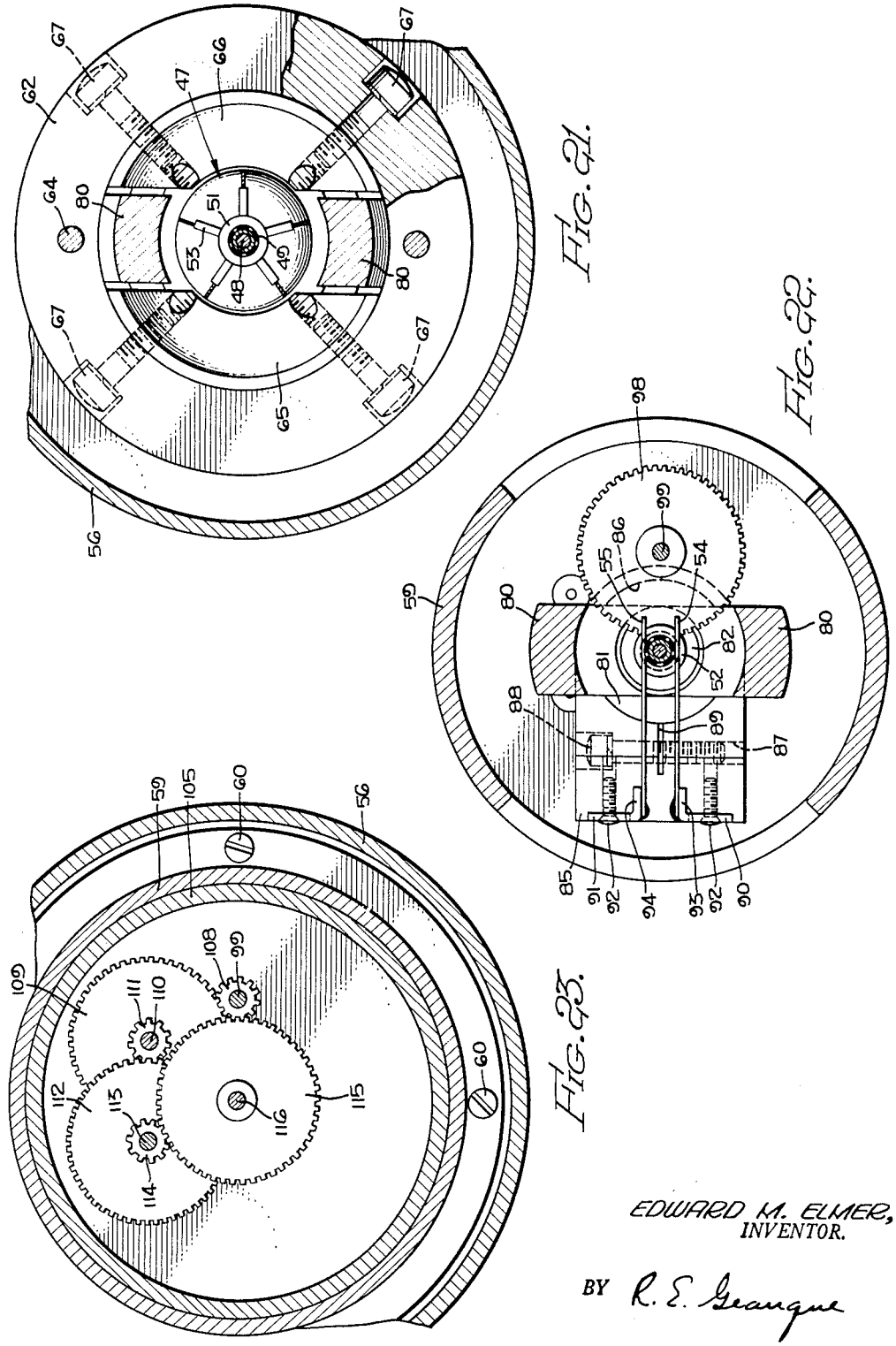

Oct. 18, 1955
E. M. ELMER
2,721,284
INTEGRATING MOTOR
Filed May 3, 1952
10 Sheets-Sheet 10
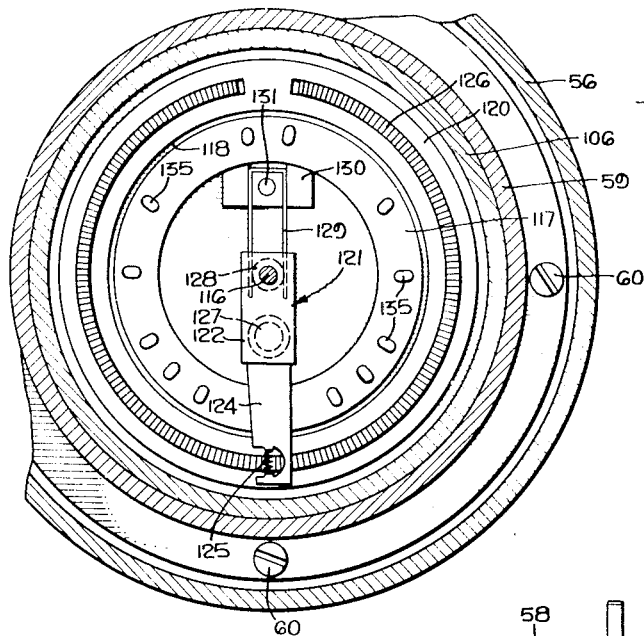
Fig. 25.
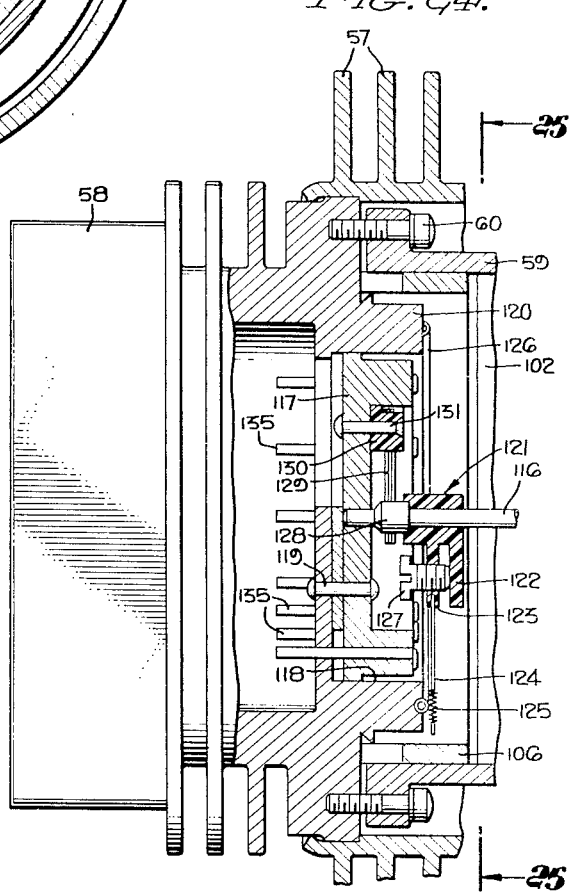
Fig. 24.
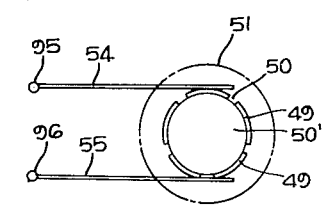
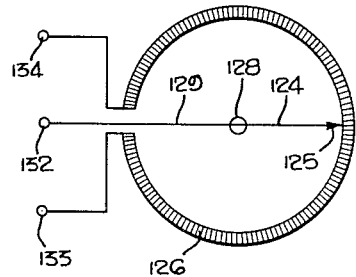
Fig. 26.
EDWARD M. ELMER,
INVENTOR.
BY R. E. Granque
ATTORNEY

United States Patent Office 2,721,284
Patented Oct. 18, 1955

2,721,284

INTEGRATING MOTOR

Edward M. Elmer, Santa Monica, Calif., assignor to Summers Gyroscope Company, Santa Monica, Calif., a corporation of California Application May 3, 1952, Serial No. 285,928

20 Claims. (Cl. 310—266)

This invention relates to an integrating motor and to a method of constructing the armature for such a motor. More particularly, the invention relates to an electric motor which has a high torque to inertia ratio so that the motor can run on minute voltages and the speed of the motor can closely follow transient voltages.

In electric motors of conventional design, a high torque to inertia ratio is not possible because of the existence of high armature inertia and high eddy current and friction losses. These objections have been overcome by utilizing an armature for the integrating motor of this invention which has a minimum of mass obtained by suspending the armature winding in air without any supporting frame. The armature windings are impregnated with non-conducting material which binds the wire bundles together so that they form a self-supporting structure. Since there is no moving iron in this armature, there are no eddy current losses. Also, the friction level of this integrator motor is held to a minimum by using small diameter bearings, and commutator friction is held to a low level by virtue of a small diameter and use of light brush pressure. Except for slight brush and bearing friction plus wind resistance at higher speeds, there are no other losses in the motor and therefore the motor speed can be nearly proportional to the applied voltage. This feature makes it possible for the motor to run on minute voltages and for the speed of the motor to substantially follow small transient voltages, either positive or negative. Because of the very small lag between changes in voltage and changes in motor speed, the motor can be utilized as an integrating motor which will integrate variations in voltage over a given period of time and a variable voltage range.

The method of forming the motor armature includes the steps of forming the armature coils into the approximate shape of the armature and then impregnating the coils with a plastic. The plastic serves to hold the coils in position without the necessity of additional support. Two sets of fixtures are utilized, one for forming the armature shape and one for impregnating the coils with the plastic material. This method makes possible the construction of an armature which is of light weight with no eddy current losses.

It is therefore an object of this invention to provide an electric motor which has minimum motor losses so that the motor can respond to minute voltages and to small voltage variations.

Another object is to provide an electric motor armature which is impregnated with a non-conducting material so that no additional supporting means are required for the armature coils and therefore there are no eddy current losses in the armature.

A still further object of the invention is the provision of an integrating motor which develops a speed nearly proportional to the applied voltage so that the speed of the motor can closely follow voltage variations.

A further object of the invention is to provide an electric motor armature which has a minimum of mass so as to appreciably reduce the inertia of the motor.

Another object of the invention is the provision of a novel method of fabricating a motor armature by first shaping the armature coils and then impregnating them with non-conducting material.

These, and other objects of the invention, not specifically enumerated above, will become obvious from the following description in which:

Figure 1 is a perspective view of one of the armature coils utilized for the motor armature.

Figure 2 is a perspective view of the armature coils illustrating the correct relative location of the coils.

Figure 3 is an elevation view of the armature coils as first positioned on the tying fixture by the top pins.

Figure 21 is a vertical sectional view along line 21—21 of Figure 20 illustrating the mounting for the motor pole pieces.

Figure 22 is a vertical sectional view of the commutator brushes for the motor along line 22—22 of Figure 20.

Figure 23 is a vertical sectional view along line 23—23 of Figure 20 showing the reduction gearing of the gear train.

Figure 24 is a transverse vertical sectional view, along line 24—24 of Figure 19, of the potentiometer actuated by rotation of the integrating motor.

Figure 25 is a vertical sectional view of the potentiometer controlled by the integrating motor taken along line 25—25 of Figure 24.

Figure 26 is a schematic wiring diagram showing the electrical leads for both the commutator and the potentiometer.

Figure 4:
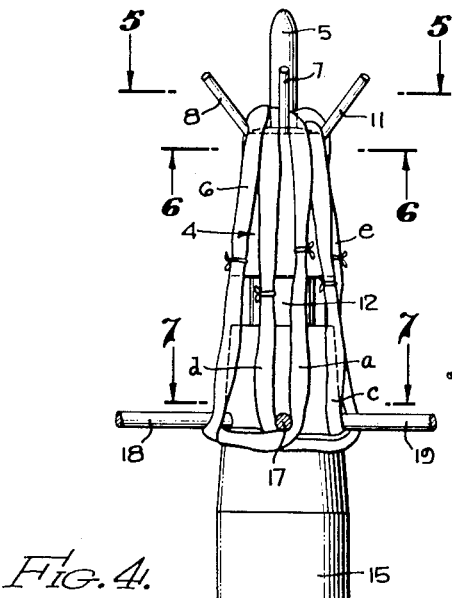
Figure 4 is an elevational view of the armature coils after having been stretched by the tying fixture.

In the construction of the armature for the integrating motor of this invention, a number of armature coils identical with coil 1 shown in Figure 1 are first wound and the ends of the coil are tied to the body of the coil by the strings 2 so that the two ends are left free to form leads. A curved section 3 is next formed at the top of the coil by simply pressing the coil against a hand tool of the desired shape. The coil wire consists of insulated copper wire of any suitable size, preferably size No. 44. The number of loops in the coil can be varied in accordance with the size of the wire to be used.

In the present embodiment, five such coils, designated as $a$, $b$, $c$, $d$ and $e$ throughout the various views, are assembled in the manner shown in Figure 2. Each coil is located in the correct position with respect to the rest of the coils as it is placed over the top of member 4 of the tying fixture. The curved section 3 of each of the coils passes around the pin 5 projecting from member 4 so that after the coils are completely assembled, the pin 5 projects through the opening 6, shown in Figure 2. Five top spacing pins 7, 8, 9, 10 and 11 are inserted in openings spaced 72 degrees apart at the top of member 4 and these pins serve to retain each coil in position as it is placed on member 4.

Figure 5:
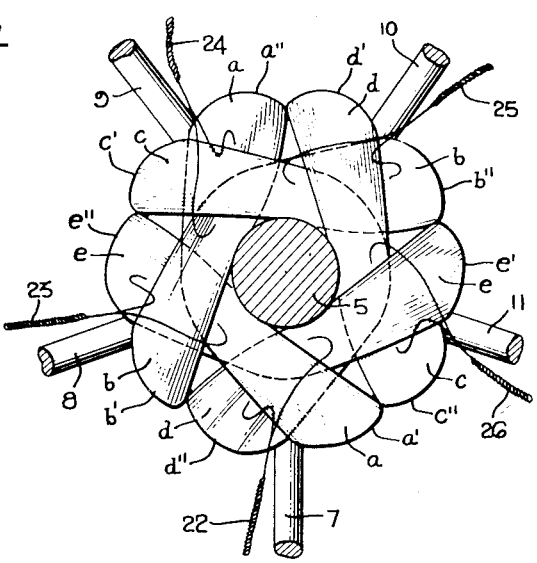
Figure 5 is a top view along lines 5—5 of Figure 4 showing the coil orientation and lead connections.

The relation of the coils in assembled position is illustrated in Figures 2 through 5 and it will be noted that the two sides of each coil are positioned 180 degrees apart. Referring more particularly to Figure 5, coil $a$ is secured at one side by pin 7 and at the other side by pin 9. As coil $a$ passes over pin 7, it likewise passes over adjacent coil $d$ and coil $e$ and then below coils $b$ and $c$. The next coil $b$ is held in position by pins 8 and 10 and as coil $b$ passes over pin 8, it likewise passes over adjacent coil $e$ and coil $a$ and then under coils $c$ and $d$. In a like manner, coils $c$, $d$ and $e$ are positioned on the top spacing pins in order to complete the armature assembly. It is pointed out that each coil is so arranged that at one of its top spacing pins it passes over the adjacent coil and at the other of its top spacing pins, it passes under the adjacent coil. This arrangement provides a means of interlocking the coils together so that they can be stretched by the tying fixture.

The member 4 is formed at one end of rod 12 while the other end of the rod normally bears against projection 13 of fitting 14. The rod 12 passes through a center opening in tightening member 15 which is threaded at one end so as to screw into the threaded collar 16 of fitting 14. Member 15 has five holes 17' spaced 72 degrees apart for receiving five bottom spacing pins, only three of which are shown in Figure 4. Each of these bottom spacing pins is positioned directly below one of the five top spacing pins and separates the same coils as the top pins above it. For instance, pin 17 and pin 7 separate coils $a$ and $d$, pin 18 and pin 8 separate coils $b$ and $e$ and pin 19 and pin 11 separate coils $c$ and $e$. The bottom spacing pins are inserted when the tying fixture is in the position shown in Figure 3 and while member 4 is in contact with member 15 and before member 15 has been screwed into collar 16.

Figure 6:
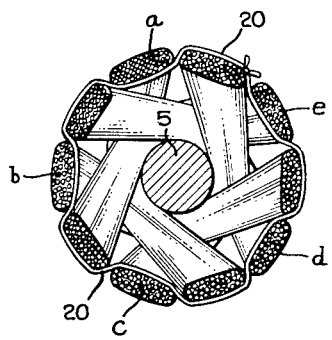
Figure 6 is a horizontal sectional view along line 6—6 of Figure 4 illustrating the manner in which the upper ends of the armature coils are tied together while still on the tying fixture.
Figure 7:
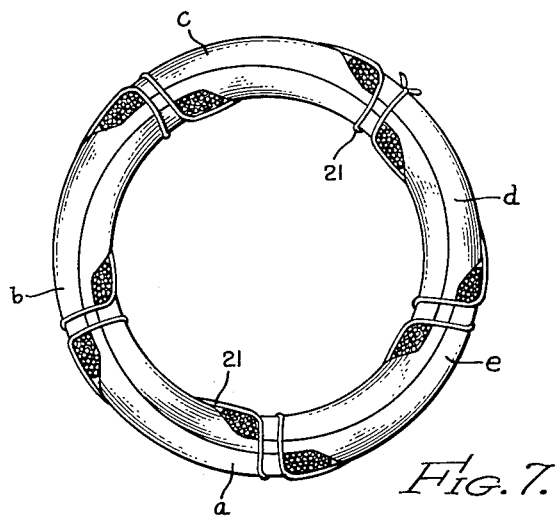
Figure 7 is a horizontal sectional view taken along line 7—7 of Figure 4 and illustrates the manner in which the lower ends of the armature coils are tied together while still on the tying fixture.

After the five coils have been assembled in correct position on the top and bottom spacing pins, the member 15 is screwed into collar 16 in order to move the bottom spacing pins away from the top spacing pins and thereby stretch the coils into the desired shape to form the armature. Member 4 will rotate with member 15 during the stretching operation since rod 12 can rotate with respect to projection 13. It will be noted that members 4 and 15 have tapered surfaces so that the final armature will also be tapered and have a larger diameter at the bottom than at the top. When the coils have been stretched into position (see Figure 4), the coils are tied together at the top of the armature by a nylon cord 20 which passes above the top spacing pins and over one coil and under the next (see Figure 6). Also, the coils are tied at the bottom of the armature in the manner shown in Figure 7 by a cord 21 which passes below the bottom spacing pins.

During the stretching operation on the tying fixture, the consecutive sides of coils are equally spaced apart from one another by 36 degrees so that there are ten equally spaced wire bundles around the circumference of the armature. The coils are connected together by connecting the lead of the coil "under" with the lead of the second coil "over" in the manner shown in Figure 5 wherein the sides of each coil are separately designated. For instance, side $e'$ of coil $e$ passes over side $c''$ of coil $c$ and over side $d''$ of coil $d$ and therefore the leads from sides $e'$ and $d''$ are connected together to form lead 22. Also, side $e''$ of coil $e$ passes under side $b'$ of coil $b$ and under side $a'$ of coil $a$ and the leads of these two sides $e''$ and $a'$ are connected together to form lead 23. In a similar manner, leads 24, 25 and 26 are formed by connecting the coil "under" with second coil "over." This type of connection makes possible the correct magnetic unbalance of the coils.

Figure 9:
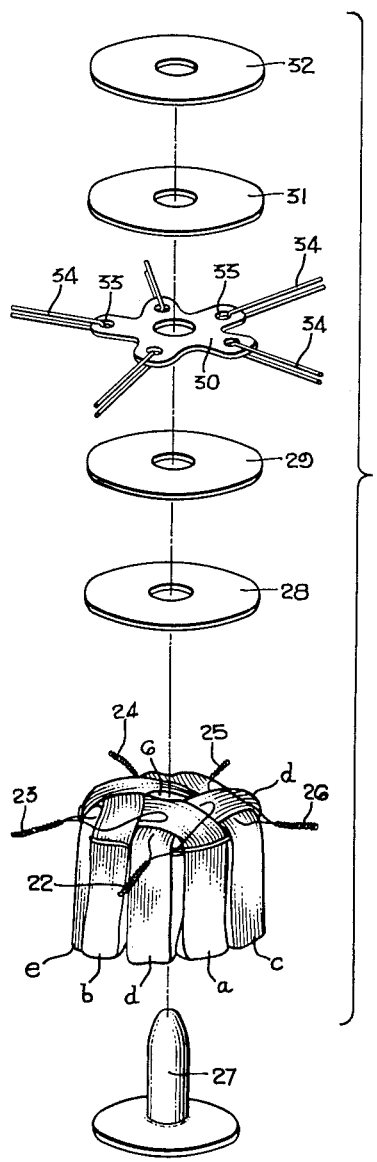
Figure 9 is an extended perspective view of the parts of the armature shown assembled in Figure 8.

After the coils have been tied together and their leads connected, the top and bottom tying pins are removed from the tying fixture to allow the armature to be slipped off the top of the fixture. The various elements shown in Figure 9 are then added to the top of the armature in the sequence indicated. The plastic armature hub 27 is inserted from within the armature through opening 6 and the two paper insulating washers 28 and 29 are placed over the hub and on top of the armature assembly. A terminal reinforcement 30 and paper insulating washers 31 and 32 are then placed over hub 27 and on top of the assembly. The terminal 30 has five openings 33 spaced 72 degrees apart for receiving the five leads 22 through 26 and each opening has a reinforcing wire 34 which reinforces the lead passing through the opening.

Figure 8:
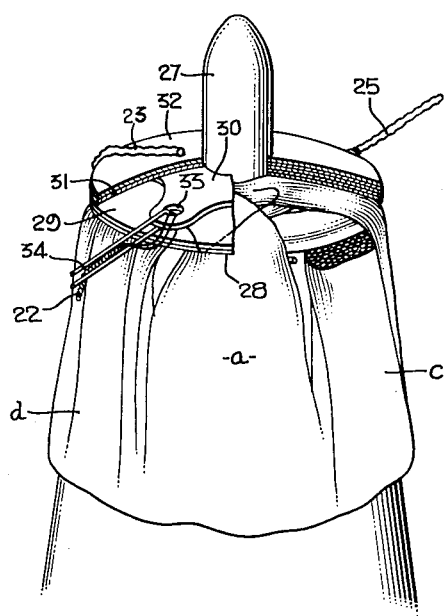
Figure 8 is a perspective view partly in cross section of the motor armature after having been removed from the tying fixture and with the armature hub and terminal reinforcement applied.
Figure 10:
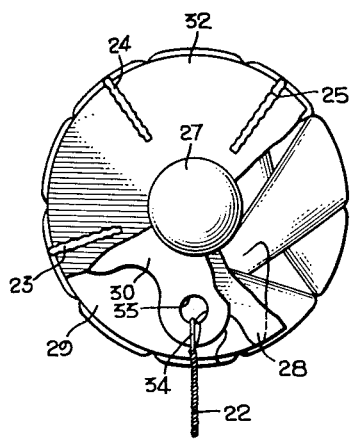
Figure 10 is a top plan view of the armature structure of Figure 8 showing a portion of the terminal reinforcement cut away.

The assembled position of the elements 27 through 32 is illustrated in Figure 8 wherein lead 22 is shown passing through an opening 33 and supported by a wire 34. Each of the coil leads 22 through 26 is twisted together with its corresponding reinforcing wire 34 and soldered to the wire in the manner shown for lead 22 in Figure 10. Thereafter, the leads and reinforcing wires are bent over to lie along the top of paper insulating washer 32.

The armature assembly is now ready to be formed in the molding fixture 35 which has a sleeve 36 for retaining a male member 37 and a female member 38. The female member has a conical opening 39 at its center which connects with a cylindrical opening 40 at one end and with a larger cylindrical opening 41 at the other end. The opening 40 receives the nose plunger 42 which has an opening to receive the armature hub 27 and has a curved surface at one end to form the top of the armature. The male member 37 is conical in shape and is connected by a cylindrical section 44 to its base 43. A base forming ring 45 is positioned in opening 41 of the female member so that it can reciprocate on section 44 of the male member and the upper surface of the base ring is curved to form the bottom of the armature. The base 43 is drilled to receive three base rods 46 which can be used to apply pressure to the base forming ring 45 when it is desired to form the bottom of the armature.

Figure 11:
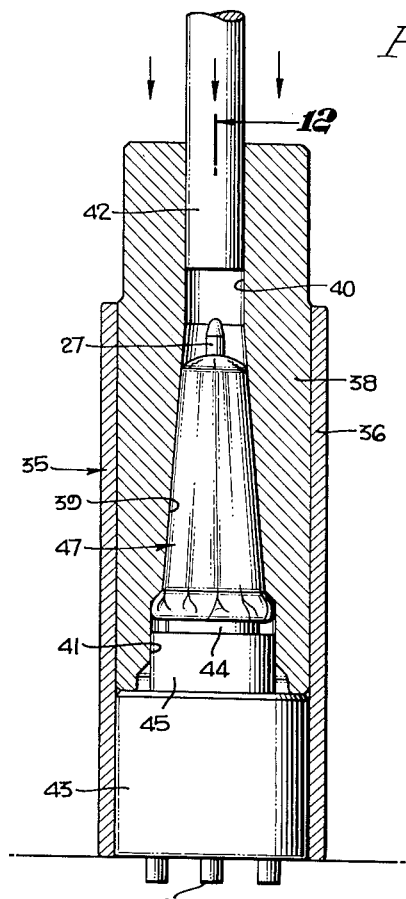
Figure 11 is a vertical sectional view of the molding fixture showing the entire armature inserted within the fixture.
Figure 13:
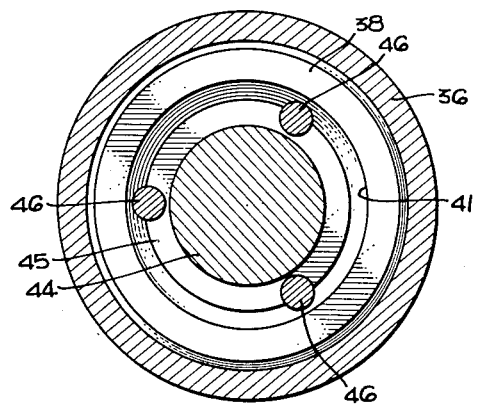
Figure 13 is a horizontal sectional view along line 13—13 of Figure 12 showing the pressure pins which are used to apply force to the base forming ring surrounding the male member of the molding fixture.
Figure 12:
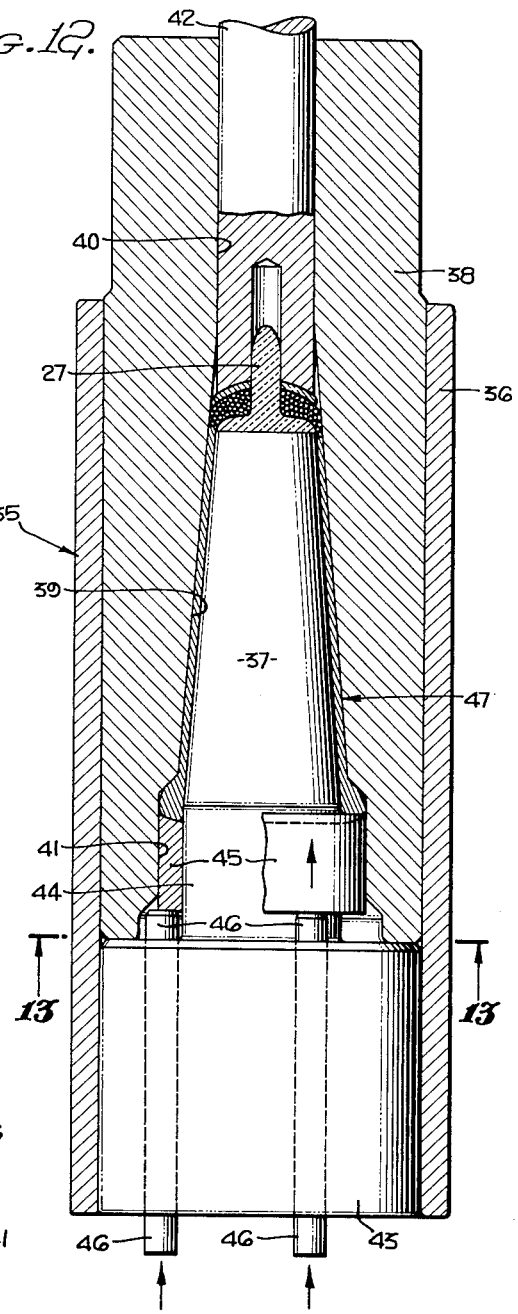
Figure 12 is a transverse vertical section along line 12—12 of Figure 11 showing the molding fixture in position to form the armature.
Figure 14:
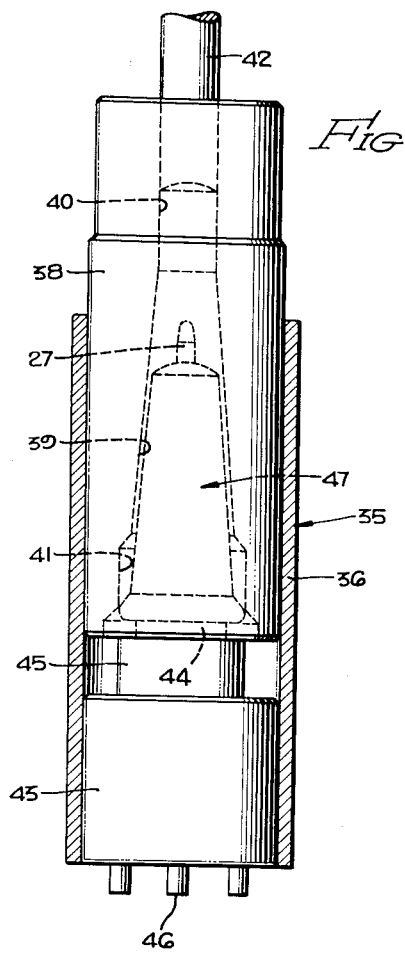
Figure 14 is an elevational view of the molding fixture with female member being removed from the male member of the fixture after a forming operation on the armature.

After the parts of the armature have been assembled, the armature is preferably first inserted between the male and female members of the molding fixture 35 and these members are forced together to give a preliminary forming of the armature. The armature is then removed and impregnated with a thermo-plastic, such as Lucite, which is dissolved in a solvent. The solvent is allowed to evaporate leaving the solid plastic. The armature is then returned to the mold and baked to the forming temperature at which the plastic becomes soft, after which pressure is applied to close the mold by bringing the male and female members into contact as shown in Figure 11. Thereafter, pressure is applied to the nose plunger 42 to form the top of the armature and then to the base forming ring 45 by rods 46 to form the bottom of the armature (see Figure 12). The armature is then allowed to cool in the mold before it is withdrawn, and at the end of the molding operation, the armature has been impregnated with a solid plastic material which is sufficiently rigid to maintain the armature in shape and yet be non-magnetic. Any well known type of thermo-plastic or resin can be used providing it remains solid over the required operating temperature range.

The molding process can, of course, be repeated by again applying the dissolved plastic to the armature and inserting it into the mold for the heating and pressing steps to be performed. By repeating the molding process one or more times, it is possible to obtain more complete impregnation of the armature with the plastic and therefore obtain a stronger plastic support for the armature coils.

Figure 15:
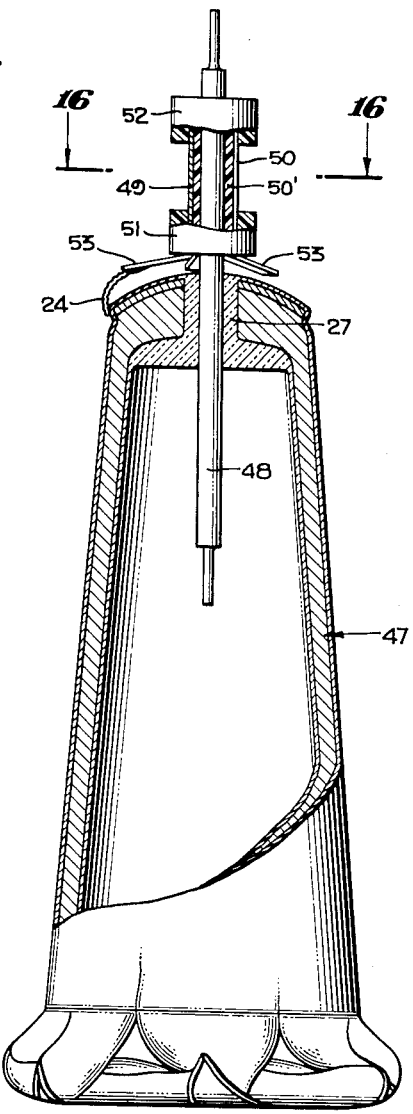
Figure 15 is an elevational view partly in cross section of the armature with the armature shaft and commutator assembled.

The completed armature 47 is shown in Figure 15 with the commutator assembly attached. In order to mount the commutator, the end of the armature hub 27 has been cut off flush with the top of the armature and a hole drilled through the hub to accommodate the armature shaft 48. The commutator itself is formed of five curved commutator bars 49 which are spaced apart by slots 50 and mounted on a tubular insulating member 50'. The bars are held on the member 50' by insulating rings 51 and 52 placed at the top and bottom of the bars. Shaft 48 is pressed through member 50' to mount the complete assembly. The bar terminals 53 which are extensions of each of the five bars 49 are positioned over the leads 22 through 26 so that one lead can be soldered to each terminal. In actual practice, each slot 50 is positioned over a coil "under" to give the proper relationship with the brushes.

Figure 16:
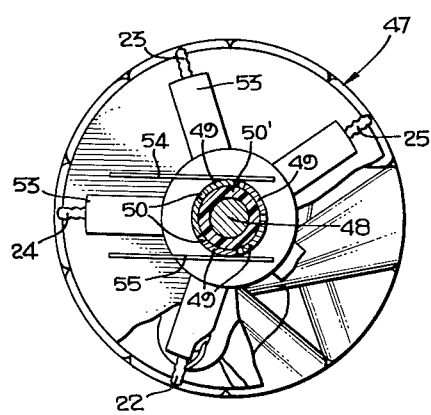
Figure 16 is a sectional view taken along line 16—16 of Figure 15 partially cut away to show the relationship of the commutator to the armature coil.
Figure 17:
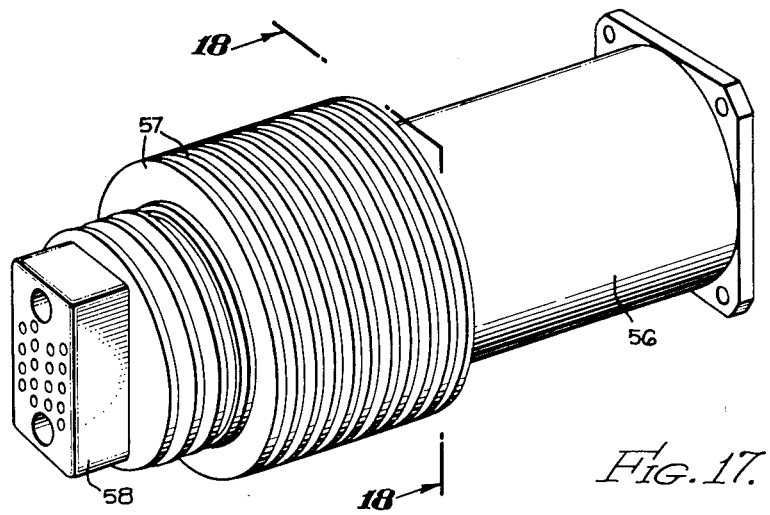
Fig. 17 is a perspective view of the casing for housing the integrating motor.
Figure 18:
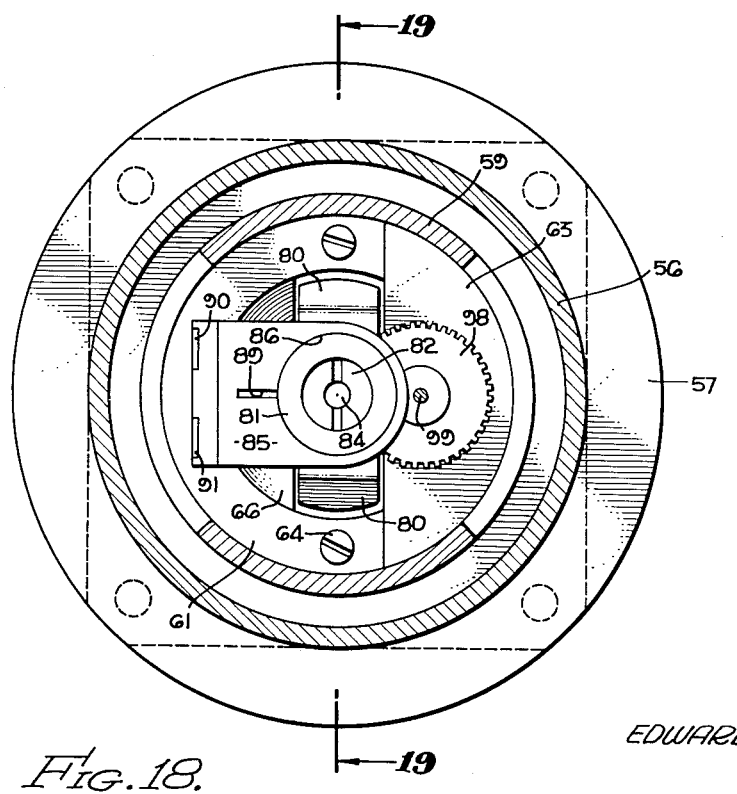
Figure 18 is a vertical sectional view taken along line 18—18 of Figure 17 showing the bearing mounting for one end of the armature shaft.
Figure 19:
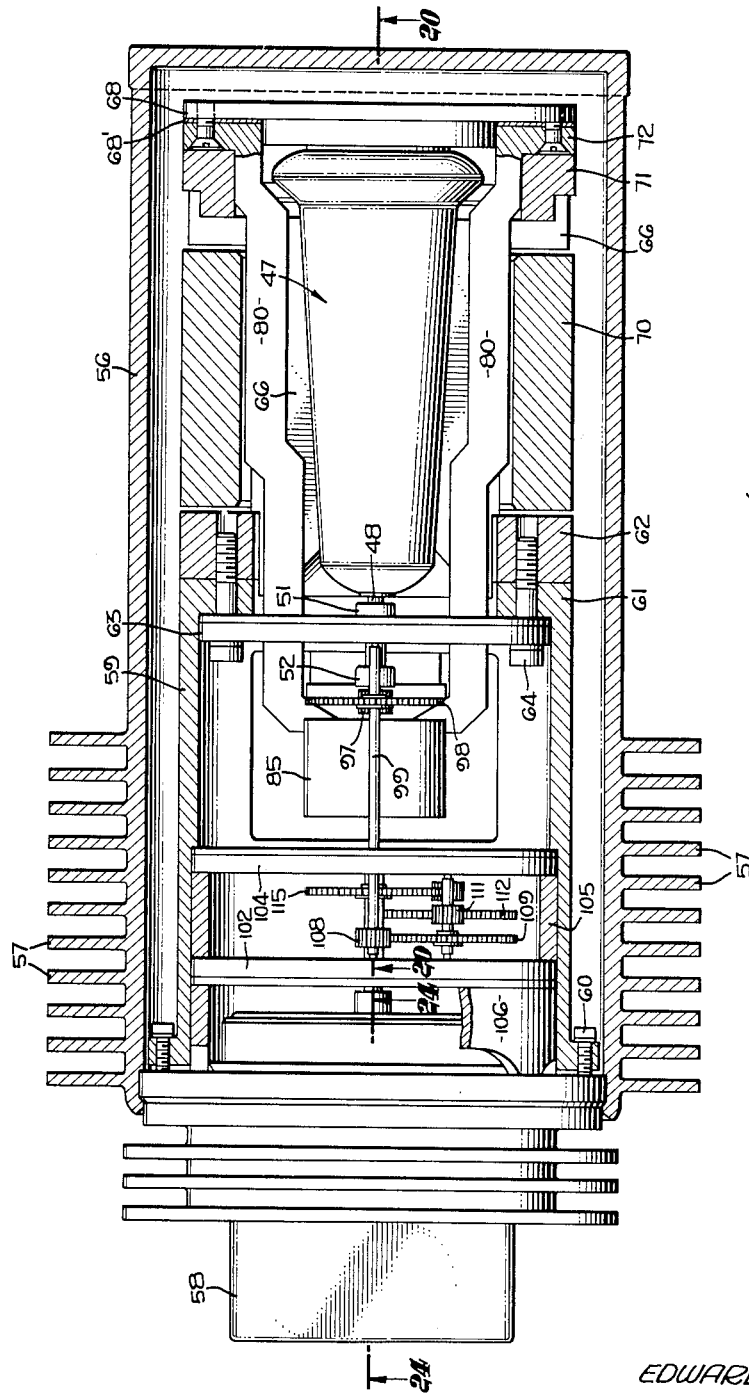
Figure 19 is a transverse vertical sectional view of the complete integrating motor along line 19—19 of Figure 18 with the motor armature in elevation.

The two commutator brushes 54 and 55 are applied to the commutator bars between rings 51 and 52 as shown in Figure 16. It is noted that in certain positions of the armature during rotation one brush will contact two bars while the other will contact one bar, but during most of the time, each brush will contact only one bar. Assuming that the field for the armature will be developed by a permanent magnet, the poles of which are on opposite sides of the armature, it is desirable to illustrate the field developed by the armature by referring to Figure 5. Assume that lead 22 is positive and lead 25 is negative, then current will flow downwardly in sides $e''$, $c'$, $a''$, $d'$ and $b''$ and will flow upwardly in sides $e'$, $c''$, $a'$, $d''$ and $b'$, and it will be seen that the field on opposite sides of the armature will be opposed. As the armature rotates, both leads 24 and 25 will become negative and the lead 22 will remain positive so that the coil $b$ will be shorted across and will be dead while current will flow downwardly in sides $e''$, $c'$, $a''$ and $d'$ and will flow upwardly in sides $d''$, $a'$, $c''$ and $e'$. Upon further rotation, lead 24 alone will become negative and lead 22 will remain positive. Under this condition the current in sides $b'$, $e''$, $c'$, $a''$ and $d'$ will flow downward and the current in sides $b''$, $e'$, $c''$ $a'$ and $d''$ will flow upwardly. From the above discussion, it will be seen that as the armature rotates, the field developed by the armature will remain substantially fixed with respect to the permanent field magnets and the magnet unbalance thus developed will cause the motor to continue to run as long as current is supplied to the commutator.

From the above description, it is apparent that a novel method has been invented for the production of an armature which has a minimum of mass and no eddy current losses. This method contemplates the assembly of the armature coils into the required shape and then impregnating the coils with a non-conducting material to, in effect, make the coils self supporting. A tying fixture is utilized to assemble and shape the coils while the armature assembly is molded in a molding fixture after being impregnated with a liquid non-conducting material. The individual coils are connected together in such a way as to insure a stationary coil field during the rotation of the armature. The armature so formed by this method can be ideally utilized in an integrating motor since the low mass of the armature and the lack of eddy current losses makes it possible for the integrating motor to run on minute voltages and for the speed of the motor to substantially follow small transient voltages, either positive or negative. Various modifications in the armature structure are contemplated since the number of coils and the manner of their connections can be varied in any well known manner and also, modifications can be made in the manner and material used to impregnate the armature assembly.

An embodiment of an electric motor utilizing the armature of this invention will now be described. The motor has a casing 56 equipped with cooling fins 57 and a connector plug 58 closes one end of the casing. A cylindrical frame section 59 is secured at one end to the connector plug by screws 60 and has a flange 61 at the other end for mounting a ring 62 and a sectional plate 63 by means of screws 64. Two crescent shaped field sections 65 and 66 are secured at one end by screws 67 to ring 62 (see Figure 21) and are fastened at the other end to spacing ring 71 by screws not shown. A circular magnet 70 encircles both of the field sections and has one magnetic pole located directly above each section. Interposed between the end of the field sections 65 and 66 and the base plate 68 by means of screws 69 are the spacing ring 71 and a yoke supporting section 72.

The base plate 68 has a conical core 73 extending therefrom which has a partially threaded center opening 74. A bearing support 75 is threaded into opening 74 and has a center opening for retaining the small bearing 76 and the end bearing 77. A frictional locking section 78 is positioned within support 75. In order to support a second set of bearings, a yoke 80 is carried by section 72 and projects through the space separating the field sections 65 and 66. The end of the yoke carries a cylindrical section 81 having a threaded opening to receive small bearing 83 and end bearing 84. The shaft 48 is reduced in diameter at both ends so that the shaft can be mounted by bearings 76, 77 and 83, 84 with a minimum of frictional loss.

Figure 20:
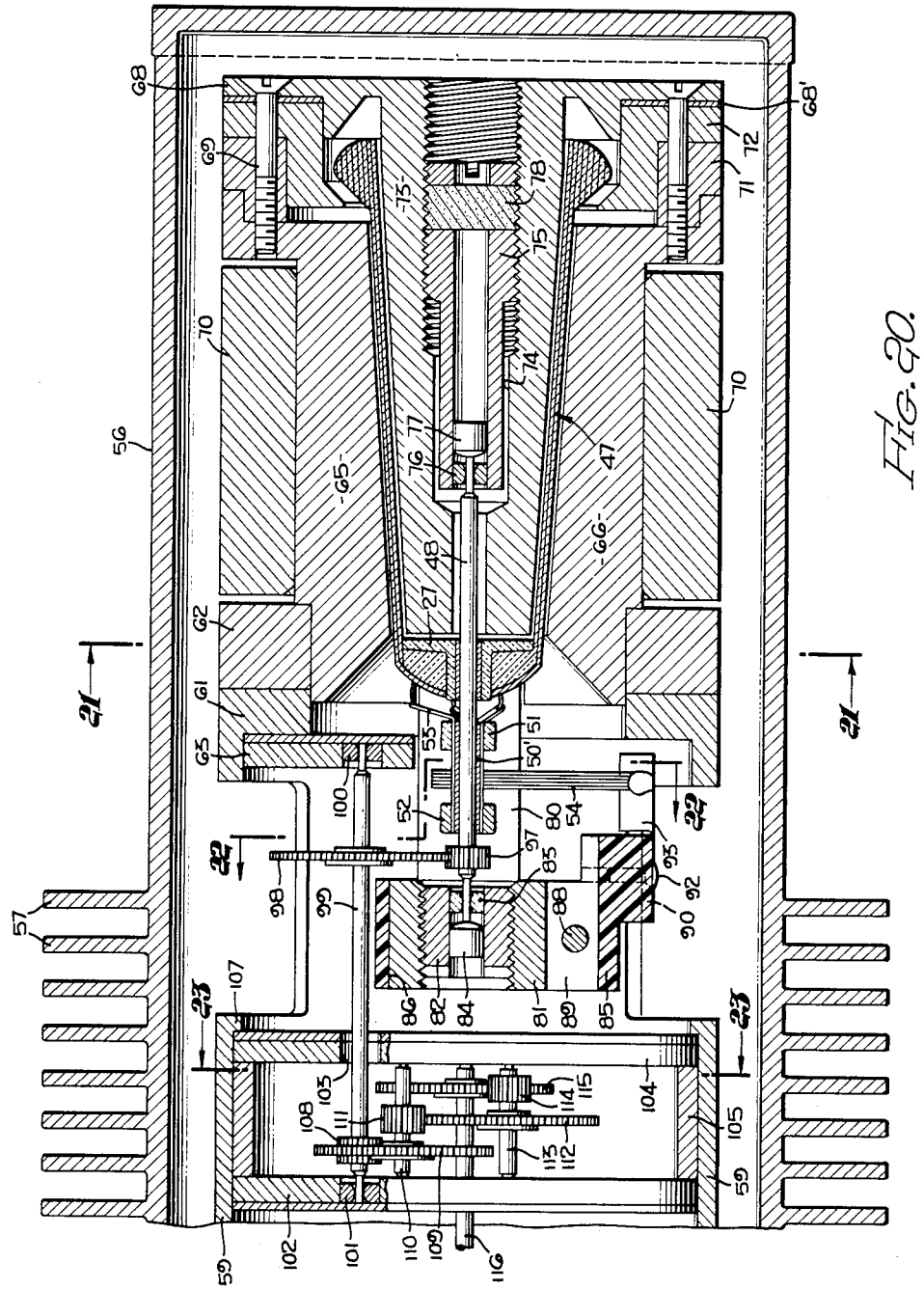
Figure 20 is a horizontal sectional view along line 20—20 of Figure 19 showing the mounting for the motor armature.

The two field sections 65 and 66 have interior surfaces which are shaped to correspond to the outside conical surface of armature 47 while the core 73 is conical in shape to correspond to the inside surface of the armature. The armature is mounted on shaft 48 by hub 27 and is positioned between the field sections and core 73 while being separated from each by air gaps. The core 73 may be longitudinally adjusted with respect to field pieces 65, 66 by varying the thickness of shim 68' (see Figure 20), thereby providing a novel means of adjusting the air gap between the core and the field pieces and the magnetic flux density within the gap. Herein is embodied a unique means of speed vs. voltage calibration.

The brushes 54 and 55 are mounted by a bracket 85 which has an opening 86 so that the bracket can be positioned over cylindrical section 81. The bracket also has a threaded hole 87 for receiving a threaded bolt 88 which passes through a slit 89 in the bracket. By tightening the bolt, the sides of the bracket can be pulled together in order to tighten the grip of the bracket on section 81. Two members 90 and 91 are secured in slots in the bottom of the bracket by screws 92 and have upright sections 93 and 94 respectively at their ends. The brushes 54 and 55 are soldered at one end to upright sections 93 and 94 respectively and project across opposite sides of the commutator bars 49 carried by shaft 48. The electrical terminals 95 and 96 for the brushes are shown in Figure 26.

A pinion 97 is carried by shaft 48 at the end adjacent bearing 83 and pinion 97 meshes with a gear wheel 98 carried by shaft 99. The sectional plate 63 contains bearing 100 for mounting one end of shaft 99 while the other end of the shaft is mounted in bearing 101 in disk 102. An opening 103 is provided to allow the shaft 99 to pass through the disk 104. Both disks 102 and 104 are retained within frame 59 and are spaced apart by cylindrical section 105 while disk 102 is spaced from connector plug 58 by a cylindrical section 106. A ledge 107 on frame 59 serves to retain disk 104 in position when screws 60 are tightened to pull frame 59 toward the connector plug.

The shaft 99 carries a pinion gear 108 at the end adjacent disk 102 and this pinion meshes with gear wheel 109 which is mounted on shaft 110. The shaft 110 is mounted by disks 102 and 104 and has a pinion 111 which meshes with gear wheel 112 on shaft 113. The pinion 114 on shaft 113 meshes with gear wheel 115 on shaft 116 which is mounted by disk 104 and cup member 117, secured by rivets 119 in an opening 118 formed by projection 120 of connector plug 58. The shaft 116 carries a mounting member 121 which has two arms 122 and 123. The arm 123 carries wiper arm 124 which has a wiper 125 in contact with a winding 126 mounted by projection 120. The pressure of wiper 125 on winding 126 can be varied by the screw 127 which is threaded in arm 123 and bears against arm 122.

During such time as the armature 47 is rotating in response to applied voltages, the wiper 125 will move along winding 126. In order that the potential at wiper 125 can be continually available, a contact 128 is mounted on shaft 116 and is connected to the wiper. A brush 129 is secured to insulated bracket 130 which is mounted on cup member 117 by rivet 131. The brush 129 is connected with electrical terminal 132 (see Figure 26) and continually bears on contact 128 so as to complete the circuit to wiper 125 in all its positions. Also, the winding 126 is connected at its ends to electrical terminals 133 and 134 in order to provide a potential drop along the winding. The various connecting terminals for the potentiometer winding are designated as 135 and pass through cup member 117 to various connections in plug 58.

It is apparent that the wiper 125 and the winding 126 make up a potentiometer which will give a voltage reading corresponding to the angular position to which the wiper has been moved by the motor. Because of this fact, the motor can be utilized as an integrating motor which will integrate variations in voltage over a given period of time and a variable voltage range. The series of reduction gears allows the motor to run continually over a period of time without moving the wiper 125 off of the winding 126. Because of the small bearings used for rotating parts of the motor, the friction level is held to a minimum and commutator friction is also held to a low level by virtue of the small diameter of the commutator and the light brush pressure. The conical shape of the core and field pieces provides a means for simple calibration of the motor speed. It is understood that variations can be made in the armature construction utilized for the motor without departing from the scope of the invention in integrating motors.

What is claimed is:

1. In an armature for an integrating motor, five coils having opposite sides and opposite end portions with the sides of each coil positioned adjacent the sides of two other coils, said coils being interlapped at one end by having the end portion of each coil passing over the end portion of two coils and under the end portion of two other coils, and a thermoplastic material impregnated in and between said coils to rigidly secure them together.

2. In an armature for an integrating motor as defined in claim 1, an opening formed by the interlapped ends of said coils to receive an armature shaft for supporting said coils.

3. In an armature for an integrating motor as defined in claim 1, a lead for each side of each coil, the lead from the side of each coil underneath the other coils at the interlapped end being connected with the second coil which passes over the end of said coil to connect said coils together, a commutator having a plurality of conductive segments each having a common terminal with a different pair of electrically connected leads, and at least a pair of brushes adapted to engage the commutator segments for producing during the rotation of the coils a stationary magnetic field dependent upon the voltage applied to the brushes.

4. A method of forming an armature comprising assembling a number of coils in interlapped relation at one end thereof, stretching said coils to straighten out the sides of the coils, impregnating said coils with a plastic material, and forming said impregnated coils into a hollow, frusto-conical shape which is partially closed at the interlapped end and open at the other end.

5. A method of forming an armature comprising assembling a number of coils into position with the coils interlapped at one end and the sides of the coils forming a frusto-conical surface, impregnating said coils with a temperature sensitive material which is rigid at operating temperatures for the armature, heating said coils in a mold after impregnation to a temperature where said material becomes soft, and forming first the sides, then the interlapped end and then the other end of the coils into final shape in the mold.

6. A method of forming an armature for an integrating motor comprising the steps of assembling a number of coils in interlapped relationship, stretching the coils into the approximate shape of the armature, impregnating said coils with a thermo-plastic material which has been dissolved in a solvent, providing for an evaporation of the solvent from the thermo-plastic material, and molding said coils into the final shape of the armature at a temperature at which the thermo-plastic material is soft.

7. A method of forming an armature comprising mounting one end of each of five coils on a set of five pins in interlapped relation with each end supported by two pins, securing the other end of each of the coils to another set of five pins so that each of said other ends is supported by two pins and the sides of the coils are equally spaced around a center axis of the five coils, moving the two sets of pins apart along said axis to stretch said coils, removing said coils from the sets of pins and impregnating said coils with a rigid material to maintain the shape of the coils.

8. A method of forming an armature comprising mounting one end of each of five coils on a set of five pins in interlapped relation with each end supported by two pins, securing the other end of each of the coils to another set of five pins so that each of said other ends is supported by two pins and the sides of the coils are equally spaced around a center axis of the five coils, moving the two sets of pins apart along said axis to stretch said coils, removing said coils from the sets of pins, impregnating said coils with a material which is rigid at the operating temperature of the armature and forming said coils into the shape of the armature at a temperature at which said material is soft.

9. A method of forming an armature comprising mounting one end of each of five coils on a set of five pins in interlapped relation with each end supported by two pins, securing the other end of each of the coils to another set of five pins so that each of said other ends is supported by two pins and the sides of the coils are equally spaced around a center axis of the five coils, moving the two sets of pins apart along said axis to stretch said coils, removing said coils from the sets of pins, impregnating said coils with a thermo-plastic material which has been dissolved in a solvent, providing for an evaporation of the solvent from the thermo-plastic material, and forming said coils into the shape of the armature at a temperature at which the thermo-plastic material is soft.

10. An integrating motor comprising a hollow armature formed from a number of interlocked wire coils and being closed at one end, a material impregnated in said armature to hold said armature in shape, an armature shaft extending through said closed end to support said armature for rotation, a conical core positioned within said armature, a pair of stationary opposed field sections positioned exteriorly of said armature and means for moving said core along the axis of said armature to vary the air gap between said core and said field sections.

11. An integrating motor as defined in claim 10 having a circular magnet surrounding said field sections, said armature and said core.

12. An integrating motor comprising an armature having tapered external and internal surfaces, a core having a tapered surface positioned adjacent said internal surface, a pair of field sections having tapered surfaces positioned adjacent said external surface, a circular magnet surrounding said field sections and means for moving the core along the armature axis relative to the internal surface of the armature to vary the air gap between said core and said field sections.

13. An integrating motor comprising an armature in the shape of a hollow, frusto-conical body having one end open and the other end closed, an armature shaft extending through said closed end for supporting said armature, a core positioned adjacent the interior surface of said armature, a pair of field sections positioned adjacent the exterior surface of said armature, and a circular magnet surrounding said field sections.

14. An integrating motor as defined in claim 13 having a support for one end of said core, said support and said end being separated by a shim which can be varied in thickness to vary the air gap between said core and said field sections.

15. An integrating motor comprising an armature formed from a number of interlocked wire coils and in the shape of a hollow, frusto-conical body having one end open and the other end closed, a material impregnated within said armature windings to hold the windings rigidly in shape, an armature shaft extending through said closed end for supporting said armature, a stationary core having a conical surface position adjacent the interior surface of said armature, said shaft being supported on stationary bearings, one of which is positioned within said core, and means for varying the air gap between said armature and said core surface by moving said core along the axis of said armature.

16. An integrating motor comprising an armature in the shape of a hollow, frusto-conical body having one end open and the other end closed, an armature shaft extending through said closed end for supporting said armature, a stationary armature core inserted within said armature and having a conical surface corresponding in shape to the interior of said armature, a pair of stationary field sections positioned on opposite sides of said armature, the surface of each field section adjacent said armature having the same shape as the exterior surface of said armature, and means for moving said core along the axis of said armature in order to vary the air gap between said core and said field sections and thereby vary the speed vs. voltage characteristic of the motor.

17. A motor having a high ratio of torque to inertia, including, a plurality of coils each having a pair of side portions and a pair of lateral portions, the coils being disposed in spaced arcuate relationship such that the axis of each coil is disposed a particular angular distance from adjacent coils, one of the side portions in each coil being disposed in interlapped relationship to corresponding side portions in the other coils, each of the first side portions being disposed in underlapped relationship to contiguous coils at one end and in overlapped relationship to contiguous coils at the other end, means for interconnecting different pairs of coils to produce a plurality of leads, means for retaining the coils in fixed positioning relative to each other, means for applying a magnetic field to the different coils, and means for introducing a voltage to different leads upon the rotation of the coils to alter the magnetic field in a pattern for driving the motor at a speed dependent upon the voltage.

18. A motor having a high ratio of torque to inertia, including, a plurality of coils each having a pair of side portions and a pair of end portions, one of the side portions in each coil being disposed in interlapped relationship with corresponding side portions in the other coils, the first side portion in each coil being disposed in underlapped relationship with particular ones of the first side portions in other coils and being overlapped with particular ones of the first side portions in the remaining coils, the second side portion in each coil being disposed in substantially the same direction as the first side portion in the coil, means for interconnecting different pairs of coils in a consistent pattern to produce a plurality of leads, and means for introducing a voltage to at least a pair of the leads at any instant to produce a magnetic field for rotating the coils at a speed dependent upon the voltage.

19. A motor having a high ratio of torque to inertia, including, a plurality of coils each having a pair of side portions and a pair of lateral portions, one of the side portions in each coil being disposed in interlapped relationship with corresponding side portions in the other coils and in a consistent pattern for each coil, the other side portion of each coil being disposed in substantially parallel relationship to the corresponding side portions of the other coils, and means including a thermoplastic impregnating material for maintaining the coils in fixed positioning relative to each other, and means for applying a voltage to said coils in a manner to provide a magnetic field which remains stationary during rotation of the coils.

20. In an armature for an integrating motor, a number of individual coils having only two opposite sides and only two opposite end portions, said coils being interlapped at one end and formed into a hollow, frusto-conical shaped body having said interlapped end partially closed and the other end open, an opening in said partially closed end for receiving an armature shaft for supporting said coils, and a thermoplastic material embedded within and between said coils in order to maintain the coils rigidly in shape on said armature shaft.

References Cited in the file of this patent

UNITED STATES PATENTS

| Number | Name | Date |
| --- | --- | --- |
| 377,683 | Mather | Feb. 7, 1888 |
| 414,659 | Seafert | Nov. 5, 1889 |
| 541,641 | Still | June 25, 1895 |
| 925,504 | Porsche | June 22, 1909 |
| 1,605,796 | Tanzler | Nov. 2, 1926 |
| 1,991,696 | Phelps | Feb. 19, 1935 |
| 2,432,267 | Adamson | Dec. 9, 1947 |

FOREIGN PATENTS

| Number | Country | Date |
| --- | --- | --- |
| 867,162 | France | July 7, 1941 |
| 894,422 | France | Mar. 13, 1944 |